Oct. 24, 1961  G. B. WHINERY  3,005,896
THERMO-RESPONSIVE SYSTEM
Filed Aug. 20, 1956  5 Sheets-Sheet 5

INVENTOR.
George B. Whinery.
BY
Harness, Dickey & Pierce
ATTORNEYS

United States Patent Office 3,005,896
Patented Oct. 24, 1961

3,005,896
THERMO-RESPONSIVE SYSTEM
George B. Whinery, Ann Arbor, Mich., assignor to King-Seeley Thermos Co., a corporation of Michigan
Filed Aug. 20, 1956, Ser. No. 604,867
19 Claims. (Cl. 219—20)

This invention relates to temperature controlling systems.

Systems for automatically controlling the temperature of a body normally include a source of heat in heat transfer relation with the body, a sensing device subjected either to heat from the source or to heat from the body, or both, and a controller responsive to the sensing device for regulating the source of heat. For the most part, automatic temperature controllers have taken the form of a bimetallic element responsive to sensed temperature and carrying one of a pair of mating contacts, those contacts being connected in circuit with a relay or solenoid controlling the source of heat.

Thermostatic devices of that nature have conventionally been endowed with a mechanical temperature spread—a difference between that sensed temperature at which the device will energize the source of heat and the higher sensed temperature at which the device will deenergize that source. The temperature of the body being heated consequently tends to undulate at least over this temperature range and normally over a substantially greater range due to the thermal inertia or lag of the heat source, of the body, and of any ducting, container or medium transferring the heat from the source to the body.

Many arrangements have been proposed for reducing the magnitude of the temperature undulations. In one line of investigation, thermostatic operation is retained, but means, normally constituting some form of "anticipator" heater, are provided for reducing the magnitude of the temperature spread of the bimetal.

Another line of investigation evolved from the early recognition that hunting and other disadvantageous effects of thermal inertia or lag could be mitigated by pulsing the source of heat, that is, by energizing and deenergizing the main heater primarily as a function of time and at a higher frequency than that normally accruing from straight thermostatic control. The thermal inertia of the heater and of the heated body tends to integrate the pulse-form energy output so that by varying the ratio of on or energized time of the heater to the off or de-energized time, the energy output of the heater can be varied continuously from approximately zero to approximately 100% of capacity. Any such system requires a time base or pulser, and, if automatic temperature regulation is to be achieved, some form of temperature sensing means modifying either the action of the pulser or the response of the main heater to the pulses.

In one approach, the source of heat, whether a resistance heating element or otherwise, is controlled electrically through a pair of contacts which are repetitively opened and closed by a motor-driven cam, with automatic temperature regulation being achieved by utilizing a temperature sensing means to modify the operation of the contacts by the cam. Thus, in the system disclosed in P. R. Owens Patent 1,812,897, granted July 7, 1931, as well as in more recent systems such as that shown in E. K. Clark Patent 2,500,061, granted March 7, 1950, the motor derived time base is modulated by hydraulic temperature sensing equipment, while Patent 2,246,186, granted June 17, 1941, to D. C. Prince teaches that the on/off ratio of heater operation can be modified by the use of a bimetallic senser element.

Others have concluded that it is advantageous to incorporate the heater-controlling contacts in an electrically operated relay mechanism. In some cases that relay mechanism is utilized as the time base generator as in A. H. Waage Patent 2,163,297, granted June 20, 1939, in which a self-interrupting thermal relay is employed to control the main heating element, the frequency of contact operation and duration of contact closure being determined by a temperature senser in the form of a high temperature coefficient of resistance element. Systems of the type shown in the A. E. Rudahl Patents 2,510,038 to 2,510,040 may be similarly characterized. In other cases, the relay mechanism is passive, responding to electrical pulses supplied by a separate pulsing mechanism. For example, in C. T. Smith Patent 2,220,028, granted October 29, 1940, an electro-magnetic relay mechanism is controlled conjointly by a thermocouple and a motor-driven potentiometer serving as a sawtooth wave generator. British Patent 499,235, complete specification accepted January 20, 1939, and G. T. Collins Patent 2,727,-973, granted December 20, 1955, both show temperature controlling systems employing separate electrical pulsing and responding units, a self-interrupting thermal relay supplying pulses of electrical energy of a frequency which is or may be constant to a thermal relay responder. In both cases, the controlled temperature is sensed directly by a bimetallic element which is a constituent part of the responder. At least in the Collins arrangement, the termination of each pulse is in effect determined thermostatically rather than on a pure pulsing basis.

The objects of the present invention are to improve the capabilities of temperature controlling equipment to heat a body to a selected temperature at a rapid rate and yet avoid overshooting of that temperature, to maintain the temperature of the body at a selected value independent of the thermal capacity of the body or of variations in that capacity, to vary over a wide but regulated range the thermal input to relatively constant-temperature bodies such as boiling liquids, and to reduce the cost of manufacture and maintenance of precision temperature control apparatus.

The principles of the invention are particularly applicable to the control of the temperature of foods being cooked or of their containers, and are representatively embodied, in the disclosed arrangement, in a system for controlling the temperature of a pan or pot placed upon a heating unit mounted in or on the top surface of a stove. In that illustrative embodiment, the control equipment is shown in association with an electrically operated stove employing resistance-type heating elements.

In the automatic control of the cooking temperature of foods, the controlled temperatures are generally higher and the required range of adjustment is generally greater than that customary in many other temperature controlling fields. Additionally, the system must be capable of controlling the temperature of bodies of grossly diverse thermal capacities—from a small pan containing a small mass to be cooked, to a large pot of water. As a further complication, the thermal capacity of the load may change substantially during the cooking operation, as when water boils off or when additional constituents are added to a cooking mass. In certain types of cooking, such as frying, the desired body temperature determines, for any given load, what the heat output of the source must be, but in other circumstances, such as boiling water, it is highly desirable that the heat output of the source be variable over a substantial range even though the sensed temperature remains effectively constant.

Fundamentally, the design of the subject system is predicated upon the belief that improvement in the accuracy of cooking temperature control can be achieved by a departure from any form of true thermostatic operation and by greatly increasing the system sensitivity.

In thermostatic operation, as that term is here employed and generally understood, the source of heat is turned on or off, or both, when the sensed temperature reaches a selected value. In the true pulsing operation of the disclosed system, while the on/off ratio of heater operation is controlled, for any setting of the system, by temperature, the heat is turned on and off in response to time-base pulses.

To achieve increased and adequate system sensitivity, the sensing element must not only be capable of detecting minute temperature changes, but must have very little inherent thermal inertia so that there will be substantially no delay between the occurrence of a temperature change and the reflection of that change in a selected characteristic of the senser. Secondly, the remaining elements of the system must be capable of rapidly responding to the senser indication so as rapidly to provide the requisite correction of the heat output.

During the course of certain preliminary investigations, the sensing and responding functions were sought to be performed by a unitary mechanism in the form of a contact-carrying bimetallic strip located centrally of a surface heating unit and disposed in heat transfer relation with the food-containing pan or pot. As others have appreciated, substantial difficulties accrue from such an arrangement. The mass of the unit and the extent of the separation of a major portion of the bimetal from the pan tend to reduce both the sensitivity and the rapidity of response of the bimetal to temperature changes. Additionally, the bimetal tends to be subjected to direct heat from the heat source, so that, as others have taught, either elaborate thermal insulating arrangements must be provided or some means must be employed to compensate for the effects of this direct source heat upon the sensing bimetal.

As a result of these investigations, it was concluded that optimum sensing sensitivity could be achieved in a system in which the sensing and responding functions are performed by discrete and separate equipment entities, permitting the use of a low-mass, fast-acting sensing element in intimate thermal contact with the object the temperature of which is to be controlled. It was further concluded that optimum system sensitivity could be achieved by employing pulse-type operation, utilizing a pulse rate much higher than that heretofore employed in commercial practice to permit a substantially instantaneous adjustment of the heat output in response to sensed temperature changes.

In general, in the disclosed system, a pulsing device supplies square-wave pulses of electrical energy the frequency and on/off ratio of which are varied only to compensate for supply voltage variations and to insure that the average transmitted energy is effectively constant. These pulses, modulated in amplitude by the senser, are applied to a thermal-relay type of responder which is adapted to follow, rather than integrate, the pulses. Both the pulser and the responder are insensitive to the temperature of the source of heat and to the temperature of the controlled object, both being either thermally insulated therefrom or being constructed to be effectively non-responsive to any external source of heat, or both. The responder, which includes a polymetallic element, a pair of electrical contacts and a heater, has the inherent thermal lag which was found to be a disadvantageous senser characteristic, but which is essential to the functioning of the unit as a responder. By virtue of that characteristic, the ratio of closed time to open time of the responder contacts will vary with the amplitude of the input pulses, which amplitude, as above noted, is modulated as a function of temperature by the sensing device. The responder contacts are connected to control the main heat source, energizing and deenergizing the source at the pulse frequency but at a temperature-controlled on/off ratio during each pulse period. The thermal inertia of the source of heat coupled with the thermal capacity of the pan and its contents serve effectively to integrate the pulses so that the temperature of the body being heated does not undulate at the pulse frequency, and the high pulse frequency further permits a rapid shift in the on/off ratio of main heater energization so that the average heat output of the main heater can be very rapidly adjusted in response either to sensed temperature changes or to manual resetting of the equipment.

The manner of accomplishing the foregoing objects, and other objects and features of the invention, will be perceived from the following detailed description of a representative embodiment of the invention when read with reference to the accompanying drawings in which.

Figure 1:
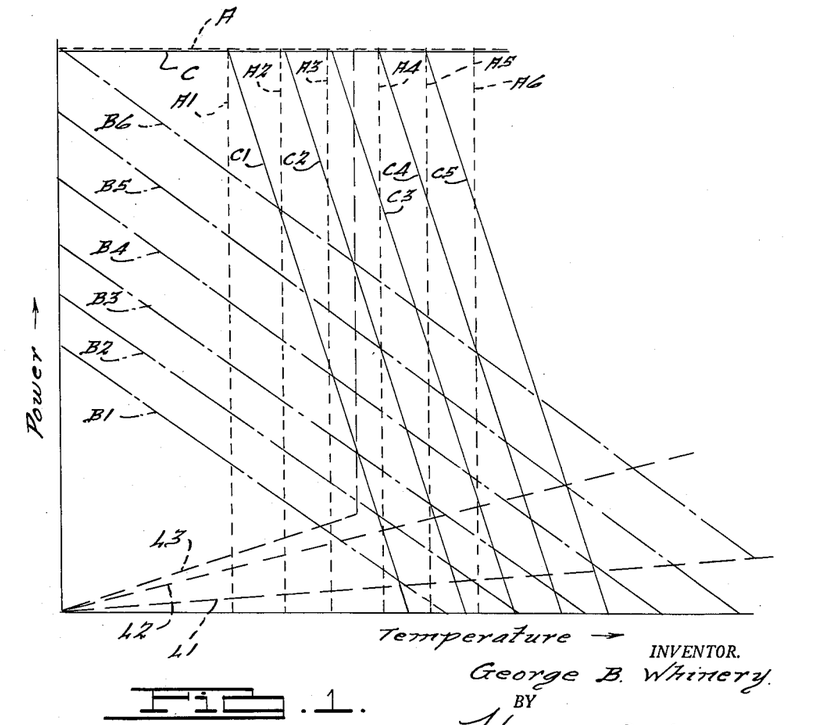
FIGURE 1 is a graphical representation of certain power-temperature relationships illustrating the nature of the operation of the preferred arrangement in comparison with certain other temperature controlling systems.

FIG. 1 of the drawings is a graphical representation illustrating the relationship between the mode of operation of the preferred embodiment of the invention and other temperature controlling arrangements. The graph is a plot of the temperature, as the abscissa, of a pot or pan placed on a surface cooking unit of a stove, versus the power, as the ordinate, supplied to a surface heater in heat transfer relation with the pan or pot. In general, the heat supplied to the pan or pot will vary predictably with the power input to the main heater so that the ordinate of the graph of FIG. 1 may also be considered to represent the amount of heat applied to the body the temperature of which is to be controlled.

The thermal characteristics of cooking utensils will vary with their materials, their size, their contents and with other factors. The thermal characteristics of any given pan with any given load, however, may be plotted, with heat-temperature coordinates, as a load line, each point on the load line reflecting the temperature of the pan at any given power input to the main heater, assuming that equilibrium conditions have been reached at that point. Three such representative load lines are plotted upon the graph of FIG. 1, load line L1 approximately representing the thermal characteristics of an empty pan or a pan having contents of low thermal mass, curve 2 representing the temperature-input power relationship of a pan containing meat or hot (but not boiling) fat, and curve L3 representing the thermal characteristics of a pan containing water. It will be observed that the slope of line L1 is small, a small increase of power being reflected in a relatively large increase in temperature while the slope of curve L2 is greater due to the higher thermal mass being heated. The slope of curve L3 abruptly shifts to a value approaching infinity at the boiling temperature of water, it being assumed that the pot is uncovered.

With conventional non-automatic temperature control, the power input to the surface heater and the heat output from that unit are constant for any given setting of the manual control dial. Therefore, for each setting the plot of power versus temperature on the curve of FIG. 1 would be a horizontal line, that is, a line parallel to the abscissa. Plural settings would of course be representable as a family of vertically spaced horizontal lines. Since each of the load lines has a slope greater than zero, each load line will intersect each manual setting line at but one point, illustrating that it is possible to manually adjust the cooking temperature of any given container and its contents, and that excellent control of the boiling rate may be obtained. However, except in the boil range, a small change in setting and power input will produce a large change in temperature since the slope of the regulating curve is zero. The difficulties in finding and maintaining the manual adjustment have prompted efforts to develop automatic temperature controlling systems for use with surface units.

In conventional thermostatic control, the main heater is turned fully on when the sensed temperature is below a selected value and is turned fully off when the sensed temperature reaches or exceeds the selected value. Dotted-line curves A and A1 to A6 represent the power-temperature characteristics of a system employing such thermostatic control, the family of curves A1 to A6 representing the operation of such a system under various settings, and curve A being common to all of the curves A1 to A6. With the equipment set at its lowest illustrated setting, the power will be fully on, as represented by curve A, until the selected temperature is reached, at which point the power will immediately drop, along line A1, to zero. Assuming this system to be perfect, the entire operation will then occur along line A1, the power being turned from full off to full on, on a cyclic, temperature controlled basis. At higher settings, similar operation will occur at the higher temperatures represented by curves A2 to A6. Since the slope of the vertical portions of these regulating curves is effectively infinite, under the illustrated idealized operational characteristics, it would be expected that such an ideal system would provide excellent temperature control when employed with loads represented by load lines L1 and L2 or by the low-slope portion of load line L3. However, as above discussed, considerable temperature undulation does exist with thermostatic control, and, equally significantly, the effective parallelism between the regulating curves and the boiling load line makes it apparent that proper control of the rate of boiling is exceedingly difficult in a thermostatic system.

It is possible to devise arrangements producing a family of regulating curves such as that represented by lines B1 to B6, in an effort to obtain automatic control with improved boiling rate regulation. Since curves B1 to B6 are of constant slope, the power input and heat output are regulated over the entire range of temperatures so that the time required to bring the plot to temperature is longer than it is, for example, with thermostatic operation.

It therefore appears that optimum operational characteristics can be achieved by providing a regulating characteristic the initial portion of which is in the nature of that represented by curve A, that is, in which the power is maintained at its maximum value until the selected temperature is approached, followed by a family of power-temperature curves of finite slope. Curves C and C1 to C5 depict that relationship. With such an arrangement, initial heating is rapid, but the fact that several of the curves in that family intersect the boiling load line indicates that the rate of boil may be accurately controlled even though the temperature of boiling does not shift. Curves C and C1 to C5 represent the manner in which the disclosed embodiment of the invention regulates the relationship between power to the heater and the sensed temperature, and, as will be seen, the family of curves C1 to C5 is theoretically infinite in number since the control is continuous.

Figure 2:
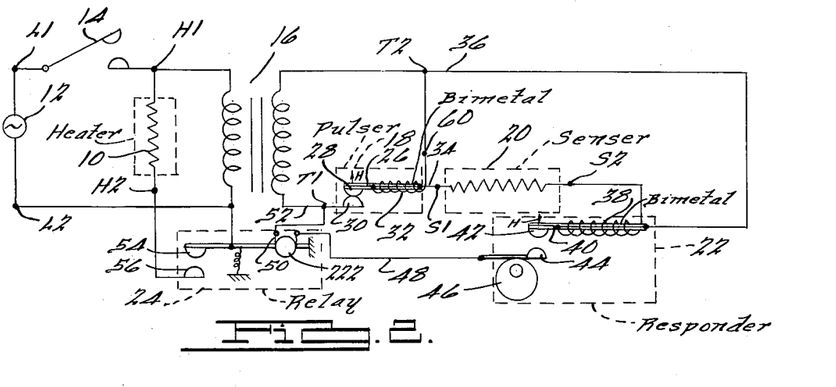
FIG. 2 is a schematic representation of the circuitry of a system embodying the principles of the present invention.

The circuitry of the preferred embodiment of the invention is depicted in FIGURE 2 of the drawings. For purposes of illustration, it is asumed that the main heater 10 is an electrical resistance unit disposed at the top of a stove and connectable, by means to be described, across a source of line power 12, normally, a 220 volt, 60 cycle per second source.

The control equipment includes a main line switch 14, a transformer 16, a pulser 18, a sensor 20, a responder 22, and a control relay 24. Upon the closure of main switch 14, the source 12 is connected across the primary winding of transformer 16 inducing a low-amplitude control voltage across the secondary winding of that transformer. The pulser 18 comprises a polymetallic leg 26 supported at one end in a manner to be described and carrying an electrical contact 28 at the other end. When bimetal 26 is cool, contact 28 is in engagement with mating contact 30 which is connected to the lower end of the secondary winding of transformer 16. A heater winding 32 is disposed in heat transfer relationship with polymetallic strip 26, one end of that winding being electrically integral with the strip and hence with contact 28 and the other end of that winding being connected to the upper end of the secondary winding of transformer 16. Since contacts 28 and 30 are closed, current may flow through those contacts and through winding 32, that current resulting in the generation of heat by winding 32 and a resultant elevation of the temperature of polymetallic strip 26. Strip 26 deflects, upon heating, in a direction to separate contacts 28 and 30. When that separation occurs, winding 32 is deenergized, and polymetallic strip 26 cools until contact 28 is again deflected into engagement with contact 30, re-establishing the initial conditions. As a result, device 18 operates as a self-interrupting pulser, cyclically opening and closing contacts 28 and 30.

In devices of this nature, the electrical contacts will be separated whenever the polymetallic strip attains a preselected temperature. The temperature of strip 26 will rise as a function of time and of the wattage dissipated by heater winding 32, so that the time required for the element 26 to deflect sufficiently to open contacts 28 and 30 will vary with the voltage appearing across winding 32 and hence with the line voltage, those contacts opening more rapidly at higher line voltages and more slowly at lower line voltages. As a result, there will appear across winding 32 a series of generally square-wave voltage pulses the frequency and period of which are relatively constant. Each cycle includes an on or voltage portion and an off or no-voltage portion. The period is the sum of the voltage and no-voltage intervals. The amplitude of the voltage during the on period will of course be determined by the then value of line source 12 but the duration of the on period relative to the off period, that is, the on/off ratio, will be automatically adjusted by the pulser 18 so that the average energy across winding 32 tends to remain constant. Hence, pulser 18 operates as a voltage regulator. In the disclosed arrangement the output energy regularly pulsates or varies between first and second values, one of which is representatively zero but can be made other than zero by connecting a resistor across the contacts.

As will be seen, in the preferred arrangement pulser 18 is disposed remotely from both the main heater 10 and the body being heated and is additionally preferably compensated so as to be substantially insensitive to ambient temperature variations. Further, means are desirably provided for controlling the average voltage output and the pulse frequency, as will be described hereinafter.

The voltage appearing across winding 32 also appears between conductor 34 and return conductor 36. This voltage is applied across a series circuit including senser 20 and the heater winding 38 of responder 22. Senser 20 is a resistance element disposed in intimate heat transfer relationship with the body, such as a pan, the temperature of which is to be sensed. The resistive element of senser 20 has a high temperature coefficient of resistance, that coefficient being positive in the illustrative embodiment of the invention. Since the value of the resistance of heater winding 38 is effectively constant, the portion of the voltage appearing between conductors 34 and 36 which appears across that winding during each on-voltage pulse will be determined by the then resistance value of senser 20. Otherwise stated, the magnitude of the current through the series circuit including the resistive element of senser 20 and the heater winding 38 during each on-voltage pulse will be determined by the resistance value of senser 20.

Heater winding 38 is disposed in heat transfer relationship with a bimetallic strip 40 mounted approximately as a cantilever and carrying a moving contact 42 adapted to engage a contact 44. The position of contact 44 is manually adjustable by means of a cam 46. In the illustrated arrangement, bimetallic strip 40 is so prestressed that contact 42 is separated from contact 44 when that strip is cool, and the constituent elements of the polymetallic strip 40 are so arranged that upon heating thereof, contact 42 will be deflected towards contact 44.

At the instant that pulser 18 closes its contacts 28 and 30, current will flow through winding 38 resulting in the generation of heat by that heater winding and elevation of the temperature of strip 40. The temperature of strip 40 at any succeeding instant during the on-voltage pulse will be determined by the magnitude of the current flow through the heater winding 38 and by the elapsed time from the commencement of the voltage pulse. In general, the temperature of the strip 40 and the physical position of contact 42 will change approximately exponentially with respect to time.

When the sensed temperature is low, as when the surface unit is first energized, the resistance of senser 20 will be low so that a relatively large portion of the voltage appearing between conductors 34 and 36 appears across heater winding 38, producing a relatively large current flow through that heater winding and a relatively high heat output from winding 38. As a consequence, strip 40 will rapidly deflect contact 42 into engagement with contact 44.

The closure of contacts 42 and 44 completes a circuit from conductor 36 through strip 40, contacts 42 and 44, conductor 48, resistance wire 50, and conductor 52 to the other end of the secondary winding of transformer 16. Resistance wire 50 has a high temperature coefficient of linear expansion and serves, when heated, to permit contact 54 to move into engagement with contact 56, in a manner to be described in detail hereinafter. The closure of contacts 54 and 56 connects heater 10 across source 12 through line switch 14, energizing heater 10.

At the termination of the on-voltage portion of the pulse cycle, heater winding 38 is deenergized and bimetallic strip 40 commences to cool. It is preferred that the electrical and mechanical parameters be selected to provide the operation represented in curves C and C1 to C5 of FIGURE 1. To accomplish this operation, the heat imparted to strip 40, when senser 20 has a low value of resistance as a result of a low sensed temperature, should be adequate to cause contact 42 not only to engage contact 44 but to tend to move further or overtravel, the supporting means for one or both of the contacts deflecting or bending in the process. Consequently, as strip cools at the termination of the on-voltage pulse, it must deflect upwardly a finite distance before contact 42 is separated from contact 44. Under the aforesaid conditions, the no-voltage portion of the pulse period is of insufficient duration for this to occur, the next on-voltage pulse commencing before contact 42 has separated from contact 44. As a result, during the initial heating of the body, contacts 42 and 44 will remain in engagement throughout a series of succeeding input pulses, maintaining relay 24 operated and heater 10 energized.

The resultant full energization of heater 10 raises the temperature of the pan and its contents at a maximum rate. As the pan temperature rises, the resistance of senser 20 will correspondingly rise so that the magnitude of the current through and the heat generated by winding 38 during the successive on-voltage pulses will gradually decrease. At some point during the heating of the pan, determined in part by the setting of cam 46, strip 40 will cool adequately momentarily to separate contact 42 from contact 44, releasing relay 24 and deenergizing heater 10. The next on-voltage pulse will reoperate responder 22 to reoperate relay 24 to reenergize heater 10, so that the on/off ratio of heater operation will be less than infinite, that is, heater 10 will be energized slightly less than 100% of the time. As the temperature of senser 20 continues to rise, the maximum temperature of strip 40 will continue to fall so that the duration of closed time of contacts 42 and 44 during each pulse period will diminish, reducing the on/off ratio of operation of heater 10. At the temperature selected by the positioning of cam 46, the on/off ratio of closed time to open time of contacts 42 and 44 during each pulse period and hence the on/off ratio of energization of heater 10 will be exactly that to produce sufficient heat to maintain the pan at the selected temperature. If the sensed temperature for any reason rises above the selected value, the ratio of closed time to open time of contacts 42 and 44 and the on/off ratio of energization of heater 10 will be appropriately diminished so as rapidly to reestablish the pan temperature at the selected value. If desired, the electrical and mechanical parameters may be so selected that if the pan temperature suddenly rises appreciably above the selected value inadequate heat will be supplied by heater winding 38 to close contacts 42 and 44 so that they will remain open for one or more pulse periods and so that the on/off ratio of heater energization for one or more pulse periods will be zero.

Since, as illustrated in the curves of FIGURE 1, lines C1 to C5 are not truly vertical, each of those temperature regulating lines will intersect a load curve such as L1 at a slightly different temperature than it will another load curve such as L2. Hence, the position of cam 46 does not always reflect exact temperature and cannot be exactly calibrated in terms of temperature except for a fixed load to be heated. However, the slope of the lines C1 to C5 is preferably sufficiently large that the temperature differential, at any setting of cam 46, between the lightest heating load and the heaviest is not great. Since the average power output of heater 10 is determined by the on/off ratio of its operation, it will be observed from the curves C1 to C5 of FIGURE 1 that the on/off ratio of operation of contacts 42 and 44 and the on/off ratio of energization of heater 10 will vary with the setting of cam 46 (curves C1, C2, C3, etc.), will vary with the heating load (the intersection of the selected regulating curve with the plural load curves such as L1 and L2) and will vary with sensed temperature except during the horizontal portion C of the regulating curves. However, with a given setting of cam 46 and with a given load upon the stove, the on/off ratio of heater energization is determined effectively exclusively by the resistance of senser 20 and hence effectively exclusively by the instant temperature of the pot. The on/off ratio of heater energization during any single pulse period is independent of the rate of change of temperature of the pot, the system being insensitive, during any single pulse period, to the rate of change of temperature with respect to time. This insensitivity accrues from the fact that the pulse frequency is so high relative to that customarily employed in the art that the pan cannot significantly and sensibly change temperature during any one voltage pulse interval.

It will be observed that the system operates on a true pulsing basis and is not to any extent thermostatic in operation. Strip 40 moves contact 42 into engagement with contact 44 solely in response to the closure of contacts 28 and 30, that is, solely in response to an electrical pulse and solely on an electrical basis. Similarly, contact 42 is separated from contact 44 only upon cooling of bimetallic strip 40 and strip 40 cools only as a result of the opening of contacts 28 and 30, that is, only in response to the termination of the voltage portion of the voltage pulse. Responder 22 is preferably situated remotely from the heater 10 and from the pot or pan thereon so as to be effectively thermally insulated therefrom and effectively insensitive to any direct heat from the heater 10 or the body being heated. In the preferred form of responder to be described, means are provided for compensating the opeartion of responder 22 for ambient temperature variations.

It is important to appreciate that responder 22 follows the pulsations of electrical energy supplied through pulser 18, lagging the operation of that pulser by an amount determined by the instant resistance of senser 20. Contact 42 will be deflected into engagement with contact 44 after the instant that contact 28 engages contact 30 by a time determined by the value of senser 20 and will always so come into engagement prior to the instant that contact 28 separates from contact 30 except when the sensed temperature is substantially above the selected and set value. Similarly, contact 42 will separate from contact 44 after contact 28 separates from contact 30 but before contact 28 reengages contact 30 except during the above-described initial heating phase of operation of the equipment. It will be observed that the value of senser 20 does not directly control the time required for contact 42 to separate from contact 44 since during the contact opening movement of polymetallic strip 40 the on-voltage pulse is terminated so that the resistance value of senser 20 is, at that instant, without significance.

As previously discussed, substantially improved results have been achieved by employing a relatively high pulse rate. The temperature of the pan is effectively sensed during the on-voltage period of each pulse. Consequently, the higher the pulse rate, the more frequently the temperature is sensed and the more frequently the input power to the heater 10 is corrected. It has been found that the optimum pulse rate from all considerations, including contact life, is in the order of eight to twenty pulses per minute, with about ten pulses per minute, a cycle period of about six seconds, being preferred. At lower frequencies, the system becomes less sensitive, and further, the heater and load may not adequately integrate the pulsating energization of the heater so that a detectable pulse-frequency undulation occurs in the pan temperature. It has been found that a small pan with a light load on a fifteen hundred or two thousand watt heater can change temperature to a substantial extent in half of a minute of full energization or deenergization. If the pulse rate be too low, the temperature undulation with a pulsing system can be even greater than that experienced with thermostatic arrangements.

As far as is known, the noted pulse rates are substantially higher than those previously employed in practice. Thus, in certain control arrangements such as those disclosed in the above-noted Owens and Prince patents as well as in Lynch Patent 2,260,838, the pulse period is indicated to be in the order of a quarter to a half hour. In other arrangements the pulse rate is increased but does not approach that found to be optimum in the disclosed arrangement. Thus, in Wilhjelm Patent 1,767,636, in Clark Patent 2,500,061 and in Smith Patent 2,220,028 the pulse period is one minute or more. The maximum disclosed pulse rate in Turner Patent 2,691,082 and in Bletz Patent 2,399,423 is about two pulses per minute.

Figure 3:
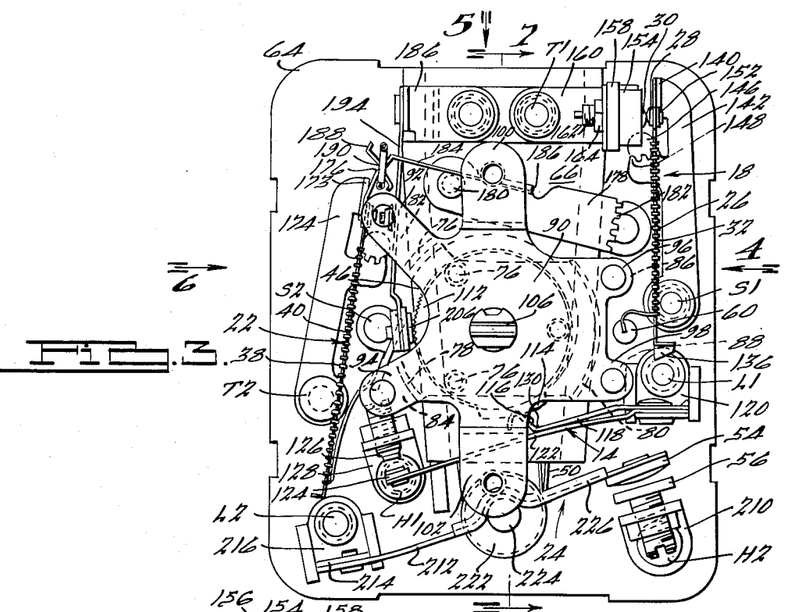
FIG. 3 is a front elevational view of an equipment embodying the principles of the present invention and embodying portions of the circuit of FIG. 2.

Those elements which were discussed in connection with the circuit diagram of FIGURE 2 and which appear in the presently preferred mechanical construction illustrated in FIGURES 3 to 10 of the drawings are designated by similar reference characters. In general, referring to FIGURE 3 of the drawings, the preferred mechanical unit includes the control switch 14, the pulser 18, the responder 22, and the relay 24. To facilitate correlation of the mechanical and electrical representations, the terminals in the mechanical drawings are designated with the same reference characters as the corresponding solder points on the schematic representation of FIGURE 2. For convenience, certain of the rivets have been given terminal designations, although it will be appreciated that separate terminal structures may be provided, the rivets being electrically integral therewith. All of the electrical interconnections of the apparatus are represented in FIGURE 3 except for a bus bar or other interconnection between terminal T2 and connector 60 to which one end of heater winding 32 is secured.

The several operating elements are mounted upon a molded plastic mounting base 64 having a central raised portion 66 extending over the major portion of its length (FIGURES 3, 5 and 7), the upstanding portion 66 defining a lower cavity 68.

Figure 4:
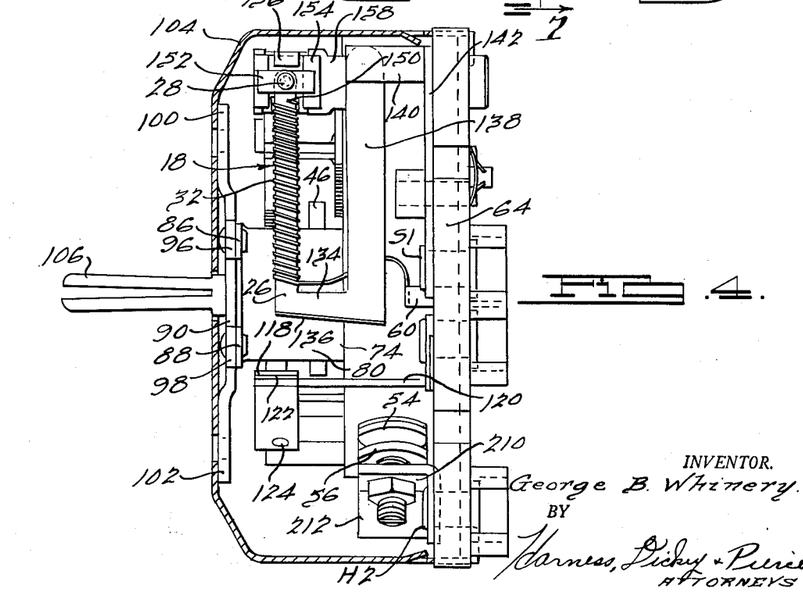
FIG. 4 is a side elevational view of the mechanism illustrated in FIG. 3 taken in the direction of the arrow 4 on FIG. 3.
Figure 5:
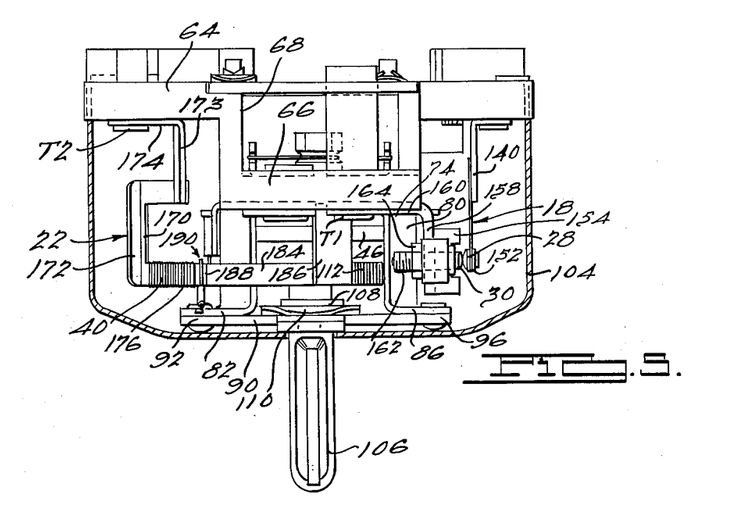
FIG. 5 is a top plan view of the mechanism illustrated in FIG. 3, taken in the direction of the arrow 5 on FIG. 3.
Figure 6:
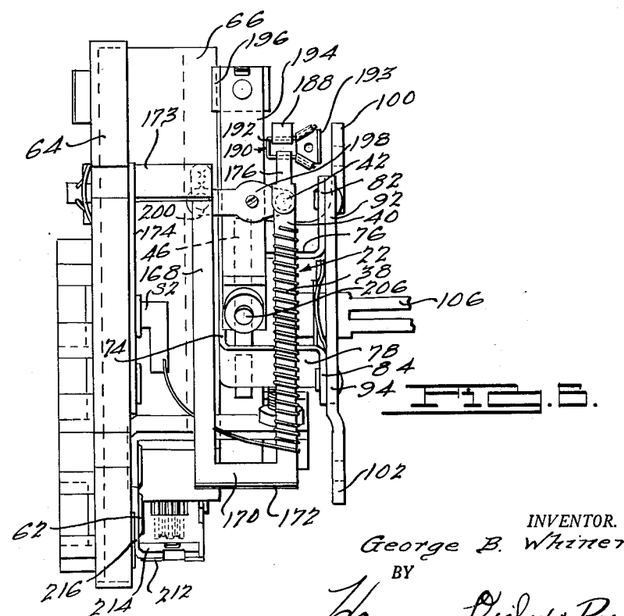
FIG. 6 is a side elevational view of the mechanism illustrated in FIG. 3, taken in the direction of the arrow 6 on FIG. 3.
Figure 7:
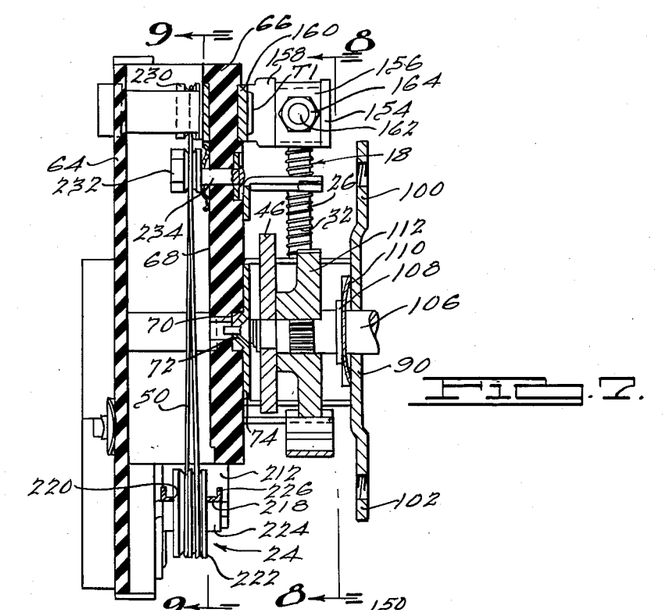
FIG. 7 is a sectional view taken substantially along the line 7—7 of FIG. 3.

As may best be seen in FIGURE 7, the portion 66 of the base 64 is provided with a recess 70 accepting the conical seat portion 72 of arbor mounting frame 74. The base of mounting frame 74 is secured to the upper surface of base element 66 by any appropriate means such as rivet 76 (FIG. 3). A plurality of integral leg portions 76, 78 and 80 extend perpendicularly to the plane of the base of the mounting frame 74, all lying generally in a cylindrical surface, as may best be seen in FIGS. 7 and 8 of the drawings. Leg portions 76 and 78 terminate in flanges 82 and 84 (FIGS. 3 and 6) lying in a plane parallel with the base of frame 74 while leg portion 80 is bifurcated to define an additional pair of coplanar flanges 86 and 88 (FIGS. 3 and 4). A six-legged bridge 90 abuts the mounting frame 74, legs 92, 94, 96 and 98 thereof, conforming in shape to, abutting and being riveted to mounting frame flanges 82, 84, 86 and 88, respectively. The remaining two bridge legs 100 and 102 are provided to permit the cover 104 (FIG. 4) to be secured in position.

An arbor 106 (FIG. 7) is supported between mounting frame 74 and bridge 90, the frusto-conical end of the arbor 106 resting in the conical seat 72 in the mounting frame 74 and a reduced-diameter projection on the end of arbor 106 extending through an aperture at the bottom of seat 72 and into an aperture in the mounting base portion 66. A split ring 108 is seated in an annular slot in the arbor 106 and spring washer 110 is trapped between ring 108 and the undersurface of bridge 90 so that it exerts a continuing force tending to maintain arbor 106 in conical seat 72. By virtue of this arrangement the effects of any play or looseness are eliminated, avoiding errors in the temperature setting of the equipment. Arbor 106 extends forwardly of the bridge 100 as a slotted shaft (FIG. 4) adapted to accept a manual adjusting knob.

Arbor 106 carries two cams: responder controlling cam 46 (FIG. 7) secured upon a reduced-diameter portion of arbor 106, which is provided with a keying flat, and a switch controlling cam 112 secured upon a knurled portion of the arbor 106 which is also provided with a flat to key the cam against rotation relative to the arbor. As may most clearly be seen in FIG. 8, which is a section taken below the bridge 90, cam 112 is circular over the major portion of its circumference (except for optional, ratcheting serrations) and is provided with a single, centrally indented lobe 114. Cam follower 116 is integral with a spring arm 118 which is riveted or otherwise secured to the upstanding leg of a mounting bracket 120 secured to mounting base 64, the cam follower portion 116 being illustrated in engagement with the indentation in the lobe 114. Contact spring 122 of switch 114 is mounted as a cantilever by the rivet which secures cam follower arm 118 to bracket 120. An electrical contact 124 is secured to the free end of spring 122 and is adapted to engage contact screw 126 adjustably supported upon mounting bracket 128. Both spring arm 118 and spring arm 122 are prestressed so that they tend to rotate through an angle in a clockwise direction.

Figure 8:
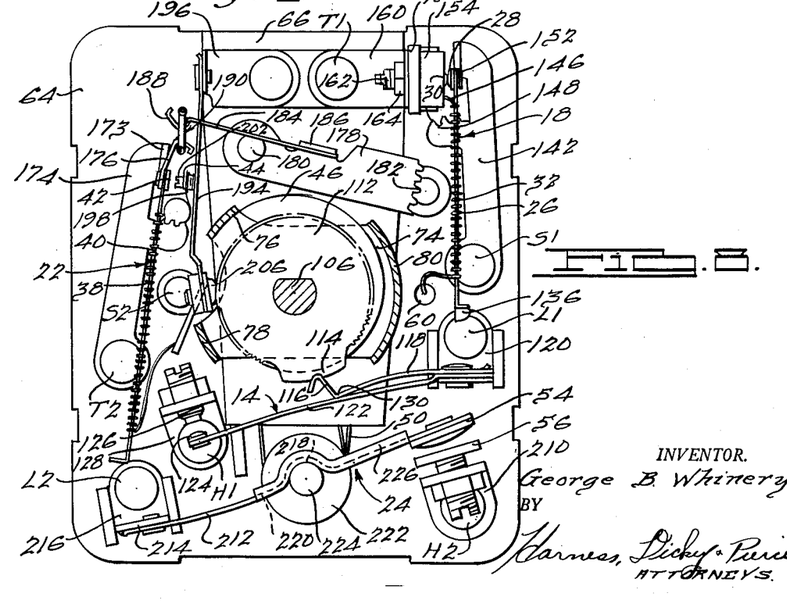
FIG. 8 is a sectional view taken substantially along the line 8—8 of FIG. 7.

In the illustrated "off" position of the apparatus, with cam follower 116 engaging the notch in lobe 114, spring 122 is prevented from bringing contact 124 into engagement with contact 126 by the abutment thereof with the knee portion 130 on cam follower spring 118. As shaft 106 is rotated in either direction, cam follower 116 rides out of the indentation in lobe 114 (provided to establish a detent action), along, and off of lobe 114. When this occurs, the contact spring 122 is enabled to deflect to bring contact 124 into engagement with contact 126 with adequate contacting force. This operation turns the equipment on, connecting the source of line voltage both to the primary of the step-down control transformer and to the relay mechanism 24 preparatory to the supply of that energy to the heat source which is to be controlled.

Upon the energization of the system in the manner just described, pulser 18 begins to pulsate. As is best illustrated in FIGS. 3 and 4 of the drawings, the primary operating element of pulser 18 is a polymetallic strip 26 which may be of the conventional laminated bimetal form or may be provided with additional layers for improvement of the current conducting capabilities thereof. Leg 26 is integral with a crosspiece 134 which is provided with an upstanding flange 136 to increase its stiffness. Crosspiece 136 is in turn integral with a polymetallic leg portion 138 the primary function of which is to so support leg 26 that the unit will be totally or to a selected degree compensated for changes in ambient temperature. It will be noted that in order to provide the desired characteristic in the now preferred arrangement leg 138 is slightly wider than leg 26 and the longitudinal axis of crosspiece 134 intersects the parallel longitudinal axes of legs 26 and 138 other than at a right angle.

The tip of leg 138 is welded or otherwise secured to the upstanding portion 140 of adjusting bracket 142. Bracket 142 is secured to the mounting base 64 by terminal rivet S1, the gripping action of that rivet being such that bracket 142 cannot be inadvertently moved or disturbed in its position by vibration. However, if an appropriately toothed key is inserted through the aperture 146 to engage teeth 148 formed integrally with bracket 142, bracket 142 may then be rotated about terminal S1 to shift the position of the cantilever mounting point of the bimetallic strip 38 and hence to change the amount of tension which the spring system is exerting tending to maintain contact 28, carried upon the free end of leg 26 in engagement with contact 30.

As previously noted, heater winding 32 is disposed in heat transfer relationship with leg 26, the end 150 of that winding (FIG. 4) being electrically connected to the polymetallic strip 26 and the other end of that winding being connected to terminal 60. With contacts 28 and 30 in engagement, heater 32 is energized to heat leg 26 so that the free end of that leg tends to deflect to the right in the view of FIG. 3, that is, in a direction to separate the contacts. Upon contact separation, the heater 32 is deenergized, strip 26 cools and the contacts are brought into reengagement.

A permanent magnetic circuit is employed to reduce the pulsing rate of the unit 18 in the disclosed representative embodiment of the invention. A generally rectangular armature 152 is fixed to the tip of polymetallic leg 26, extending generally transversely of the longitudinal axis of that leg portion. A permanent magnet 154 is retained upon the upstanding leg 158 of mounting bracket 160 by a clip 156 which embraces the permanent magnet 154 and the upstanding leg 158. Mounting bracket 160 is secured to portion 66 of mounting base 64 by a rivet which is electrically integral with terminal T1. Contact 30 is formed upon a screw 162 which passes through aligned apertures in the permanent magnet 154 and clip 156 and engages a tapped aperture in the upstanding leg portion 158, a nut 164 locking the contact in adjustment. The engagement of the contacts 28-30 prevents armature 152 from physically engaging the pole pieces of magnet 154. The flux density is sufficient, however, to resist movement of contact 28 away from contact 30 as a result of heating of polymetallic leg 26. When the force build-up is sufficient, contact 28 will snap away from contact 30. Upon the resultant termination of heating of leg 26, contact 28 is again deflected towards contact 30 and when the armature 152 becomes sufficiently proximate the permanent magnet 154 contacts 28 and 30 are snapped into reengagement.

As previously indicated, device 18 tends to maintain a substantially constant average output voltage despite variations in the voltage of the source 12. The magnitude of this voltage may be selected by adjusting the position of calibrating arm 142. While movement of this arm may have some effect upon the frequency of the output pulses, the primary controller of that frequency is the position of contact 30, as selected by the provided screw adjustment.

The output pulsations of pulser 18 are applied through the sensing device to the heater winding 38 of the responder 22 (FIGS. 6 and 8) which is somewhat similar in configuration and construction to the pulser 18. The responder 22 includes a generally U-shaped polymetallic element including leg portions 40 and 168 disposed in spaced parallelism with one another and interjoined by crosspiece 170 provided with stiffening flange 172. In this case however, the longitudinal axis of the crosspiece 170 is shown to be perpendicular to the longitudinal axes of legs 40 and 168. The tip of leg 168 is welded or otherwise secured to the upstanding portion 173 of adjusting bracket 174 which is rotatably supported upon the mounting base 64 in a manner similar to mounting bracket 142. The active contact 42 and a hooked projection 176 are riveted or otherwise secured to the free end of polymetallic leg 40

Means including projection 176 are provided for establishing an increasing force serving to oppose motion of the contact 42 in either direction from its shown position. Thus, an adjusting bracket 178 is pivotally secured to the portion 66 of the mounting base 64 by means of a rivet 180 and is capable of being moved by a key placed in engagement with the toothed end 182 thereof. A link coupler 184, of spring material, is welded or otherwise secured to upstanding leg 186 on mounting bracket 178 and is provided with a hook portion 188 at its free end. A link or frame 190 interrelates spring elements 184 and 40 and comprises, as may most clearly be seen in FIGURE 6 of the drawings, a generally U-shaped bail 192 the opposing parallel legs of which engage the apexes of hooked portions 176 and 180 and then diverge. A sheet metal member 193 extends between and is crimped around the diverging leg portions.

One end of heater winding 38 is electrically integral with the polymetallic strip 40 while the other end is secured to terminal S2. It will be recalled that as a result of the periodic energization of heater 38, leg 40 is oscillated, repetitively engaging and disengaging contacts 42 and 44. When the equipment has been idle for an adequate period, the temperature of responder 22 will be effectively equal to the ambient temperature. When the device is placed in operation, the temperature of polymetallic leg portion 40 will oscillate between two values, with a given setting of the equipment and assuming that pulsing is occurring. Both the upper temperature of strip 40, at which contacts 42 and 44 are closed, and the lower of these operational temperatures, at which contacts 42 and 44 are open, are normally substantially above the ambient value. The responder polymetallic strip 40 is illustrated in the drawings in the position which it will assume at the lower of its two operational temperatures, under assumed settings of the equipment and with an assumed senser resistance. In the illustrated position, the link 190 (FIG. 8) is substantially parallel with the longitudinal axis of the strip 40. Therefore, the force exerted by prestressed spring 184 tending to move link 190 away from hook portion 176 does not, under this condition, tend to move strip 40 from its shown position. However, as strip 40 is moved, due to temperature changes thereof, either in a clockwise or counterclockwise direction from the shown position, the force exerted by spring 184 through link 190 will increase in proportion to the amount of that deviation. At the highest of the temperature settings of the equipment, link 190 and link coupler 184 will have limited effect upon the movement of polymetallic strip 40, but as the temperature setting is decreased, those elements will have an increasing effect upon movement of strip 40.

The passive responder contact 44 is supported upon a contact spring 194 riveted or otherwise secured to an upstanding leg on bracket 196 (FIGS. 6 and 8). At a point in line with active contact 42, contact spring 194 is provided with a depending tab to which the lower offset portion of contact adjusting spring 198 is secured by rivet 200. An adjusting screw 202 is threaded in a tapped aperture in the adjusting spring 98 and is adapted to engage the adjacent surface of contact spring 194, alignment being insured by providing a reduced diameter pin at the end of the screw engaging an aperture in the spring 194. Contact 44 is secured to adjusting spring 198 at a point remote from the rivet 200 and in alignment with contact 42. Adjusting spring 198 is prestressed so as to tend to move contact 44 in a direction away from contact 42, the limit of that motion being established by screw 202.

As discussed in connection with the circuit diagram of FIG. 2 of the drawings, the temperature which is to be maintained is set by shifting the position of passive contact 44 by means of a cam 46 mounted upon arbor 106. Cam 46 has a uniform rise over the major portion of its periphery, the restoring fall being accomplished, in the representatively disclosed embodiment, within sixty degrees. Cam follower 206 is insulatedly mounted upon the free end of spring 194, that spring being prestressed to maintain cam follower 206 in engagement with the periphery of cam 46. Cam 46 is so oriented relative to cam 112 that cam follower 206 will engage cam 46 at approximately its point of least radius when follower 116 is in engagement with the notch in lobe 114 on cam 112. In practice, spring 194 is constructed of substantially heavier stock than is strip 40 so that if the temperature of strip 40, at any setting of the equipment, is raised above that temperature at which contact 42 will engage contact 44, the continued tendency for strip 40 to deflect is reflected primarily in bending of that polymetallic strip rather than in physical deflection of the contact 44 and its supporting structure.

The output current controlled by responder 22 flows through terminal T2, bracket 174, leg 168, crosspiece 170, leg 40 and through contacts 42 and 44. This current will tend to elevate the temperature of each leg as a function of the resistance of that leg. The electrical and mechanical parameters may, of course, be selected so that this heating effect is insignificant, but it has been found that improved results may be achieved by designing the structure so that leg 168 will tend to be deflected more, in response to this internal heating or thermal-current effect, than will leg 40. While this can be accomplished in a number of ways including utilizing the stiffening effect of winding 38, in practice it is preferred to reduce the width (or increase the length) of leg 168 relative to leg 40 so that its electrical resistance is higher. As a result, the temperature of leg 168 will be increased more than will the temperature of leg 40 with any given thermal current so that the differential effect will be in a direction to tend to separate contacts 40 and 44.

In the presently preferred adjusting procedure, the responder heater winding is energized through a fixed resistor having a resistance approximating that of senser resistance 20 at a selected relatively high sensed temperature, and the adjusting bracket 174 is shifted to move the strip 40 and the link 190 substantially into mutual parallelism. With the cam 46 set to its highest value, the position of the passive responder contact 44 is adjusted by shifting screw 202 to produce proper operation under the established conditions. Alternatively, the cam follower 206 may be adjustably mounted on spring 194, with the position of the passive contact 44 being varied by changing that adjustment. The calibrating resistor is then reduced in value to approximately that of sensor 20 at a low sensed temperature, the cam 46 is set to that temperature, and bracket 178 is then adjusted to achieve proper operation under those conditions.

At each closure of contacts 42 and 44, relay mechanism 24 (FIGS. 7, 8 and 9) is actuated to close its contacts 54 and 56 to energize the main heater. Passive contact 56 is adjustably mounted upon a bracket 210 electrically integral with heater terminal H2. Active contact 54 is mounted at the free end of contact spring 212 which is riveted or otherwise secured to the upstanding portion 214 of mounting bracket 216 which is electrically integral with line terminal L2. Medially of its length, spring 212 is provided with a semi-circular cylindrical offset portion 218. Spring 212 is provided with a longitudinal slot 220 extending through the offset portion 218 and a distance on either side of that offset portion. A bearing element in the form of a dual pulley or roller 222 having an integrally formed shaft 224 is supported by spring 212, portions of the roller 222 extending through the slot 220 in the spring 212, and the shaft 224 being seated in the saddle defined by the offset portion 218. Since the shaft 224 is longer than the width of the slot 220, the roller assembly cannot pass through the slot. Stiffening flanges 226 are provided at the upper and lower edges of the spring 212 and extend over the forward portion of the length of that spring.

Figure 9:
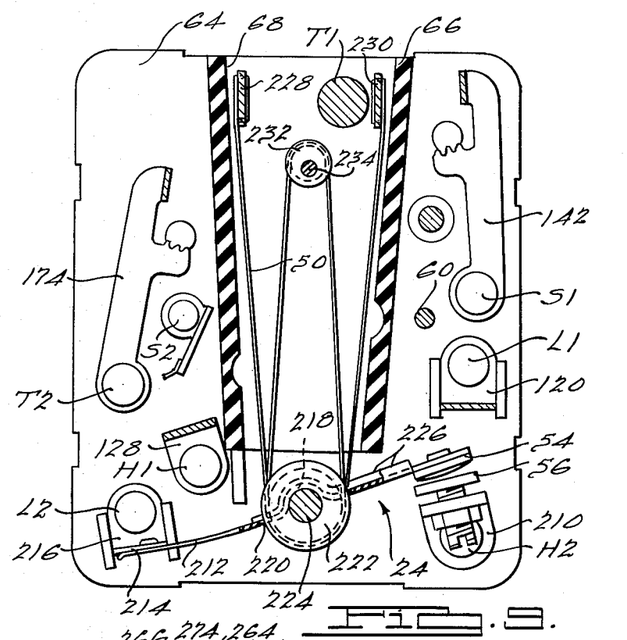
FIG. 9 is a sectional view taken substantially along the line 9—9 of FIG. 7.

The ends of the hot wire 50 are welded or otherwise secured to brackets 228 and 230. Bracket 228 is electrically integral with mounting bracket 196 which is in turn electrically integral with the passive contact 44 of the responder 22. Bracket 230 is electrically integral with the pulser passive contact mounting bracket 160 and hence with transformer terminal T1. While the resistance wire 50 may simply be looped around the pulley 222, additional structure is desirably provided for not only permitting adjustment of the tension on the wire 50 but also for providing a substantial increase in the feasible force of engagement between contacts 54 and 56. Thus, a bearing element in the form of a manually adjustable cam 232 is supported by a shaft 234 upon the portion 66 of the mounting base 64, the cam 232, along with the brackets 228 and 230 being disposed within the mounting base cavity 68. Shaft 234 is preferably integral with cam 232 and has a frictional fit in the mounting base portion 68 so that the cam may be forcefully rotated for purposes of adjustment but will not lose that adjustment in use. Under this arrangement, the hot wire 50 extends from mounting bracket 228, is passed around roller 222, seating in one of the grooves therein, extends around the cam 232, seating in a circumferential groove therein, extends back to the roller 222, seating in the second groove in that roller, and then extends to the bracket 230.

Contact spring 212 is prestressed to move contact 54 into forceful engagement with contact 56. With no current passing through wire 50, the length of that wire is selected and the cam 232 is positioned so that spring 212 is deflected to move contact 54 away from contact 56, with the wire 50 being under a preselected tension. The position of contact 56 is then adjusted to establish the appropriate contact gap. Upon the closure of the responder contacts, effectively the full voltage across the secondary winding of the control transformer is impressed across resistance wire 50. The resultant current flow through that wire will produce self-heating and consequent expansion of the wire. As the wire expands, the force restraining contact 212 is relieved, permitting that spring to move contacts 54 and 56 into engagement to energize the main heater. When the responder contacts open, the wire cools rapidly due to its low mass and large radiating surface, producing an immediate separation of contacts 54 and 56, terminating energization of the main heater. It will be appreciated that by virtue of the double looping permitted by the provision of cam 232, the prestressing force exerted by spring 212 may be effectively doubled over that which would be permissible if a resistance wire having the same tensile strength were to pass in but a single loop around roller 222. This result is particularly advantageous where the contacts 54 and 56 are called upon to control high wattage loads such as an electrical resistance surface heating unit.

The hot wire relay is the subject of the patent application of Emil E. Sivacek filed on even date herewith and entitled "Thermal Relay," Serial No. 604,918, filed August 20, 1956. That application issued August 5, 1958, as Patent No. 2,846,543.

Figure 10:
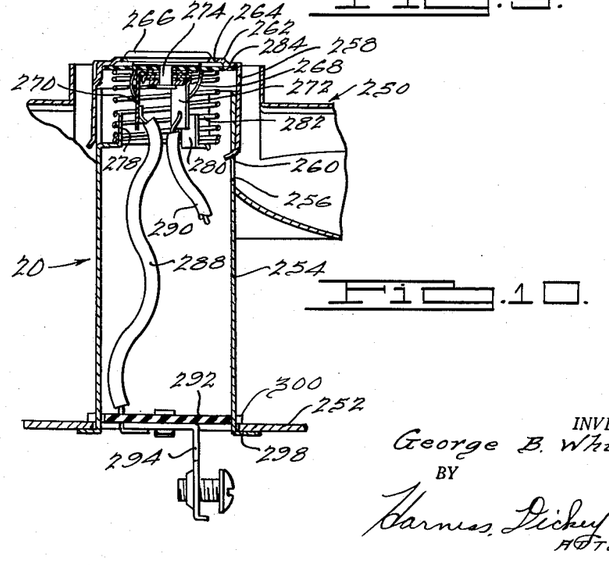
FIG. 10 is a sectional view of a sensing device suitable for association with the equipment of FIGS. 3 to 9.

While any appropriate sensing device may be employed, the preferred form is illustrated in FIGURE 10 of the drawings, and is more fully represented and claimed in the patent application of Emil E. Sivacek, filed on even date herewith and entitled Thermo-Responsive Device and Method of Manufacture Thereof, Serial No. 604,917, filed August 20, 1956.

The senser 20 is designed to be disposed within the central opening of an electrical resistance type of stove surface heating unit 250, the senser being supported within that unit by means of an integral mounting plate 252 bolted or otherwise secured to the range or stove structure.

Senser 20 comprises a tubular housing 254 having, near its upper end, three peripherally spaced slots 256. A generally tubular cap 258 telescoped over the upper end of the housing 254, is provided with three spaced-apart retaining tabs 260 depending from its lower edge and bent inwardly to engage the corresponding slots 256. The clearance between the inner diameter of cap 258 and the outer diameter of housing 254 is sufficient to permit free relative sliding motion, the upper surface of retaining tabs 260 serving as a limit stop to upward motion of cap 258 relative to housing 254 and, if desired, the lower surface of those tabs serving as a limit stop to the downward motion of cap 258 relative to housing 256.

The upper end of the cap 258 is partially closed by stepped flange 262 defining a central aperture 264. A sensing pellet 266 is resiliently supported centrally of the aperture 264.

As is disclosed in detail in the above-noted copending senser application, sensing pellet 266 preferably comprises a resistance wire 268 sandwiched between a pair of metal plates and desirably embedded in the surface of one or both of those plates, the two ends of the wire 268 being electrically secured to terminal strips 270 and 272, respectively. Terminals 270 and 272 are mounted in an insulating stack secured upon shank 274 which is preferably integral with pellet 266. Excellent results have been achieved in the system illustrated in FIGURE 2 by employing a sensing wire 40 having a temperature coefficient of resistance of 0.0045 ohm per ohm per degree centigrade, measured at 68° F. In a representative practical embodiment of the invention the length and diameter of the wire were selected to provide a resistance at 68° F. of about 10 ohms, that resistance value rising to approximately 20 ohms at 450° F. In the preferred senser, the sensing wire is insulated with glass and the plates between which the insulated wire is sandwiched and in which the wire is or may be embedded are formed of aluminum or other metals having similar pertinent characteristics.

To support sensing pellet 266 within housing 254 three offset projections including projections 278 and 280 are formed near the upper end of the housing 254 to define a spring seat centrally disposed within that housing and adapted to accept a compression spring 282 of smaller diameter than the diameter of the housing 254. The upper end of spring 282 bears against the lower surface of a support plate 284 of mica, or other insulating material, formed integrally with sensing pellet 266 as by securing it with the insulating stack upon shank 274. The upper surface of support plate 284 in turn bears against the stepped flange partial end closure 262 of the cap 258. If desired, support plate 284 may be keyed to the cap 258.

Spring 282 therefore exerts a continuing force tending to move support plate 284, cap 258 and pellet 266 upwardly to the illustrated position which is established by the engagement between the retaining tabs 260 and the upper ends of the housing slots 256. In this position, the upper surface of pellet 266 should lie in a plane above that of the surface of the stove's heating unit to insure that a pot or pan placed upon that heating unit will engage the pellet 266 even though the undersurface of the pan or pot is non-planar. The force exerted by spring 282 is relatively small so that even the lightest pan expected to be placed upon the stove will be sufficiently heavy to move pellet 266 and cap 258 downwardly in order to permit portions of the bottom surface of the pot or pan to be in direct contact with the heating unit. Slots 256 in housing 254 are preferably substantially longer than the distance which the upper surface of sensing pellet 266 extends above the plane of the heating unit.

Insulated lead wires 288 and 290 are electrically secured to depending terminal strip portions 270 and 272, respectively. These wires pass through apertures in insulating terminal plate 292 and are soldered, welded or otherwise electrically secured to individual terminals, such as terminal 294, which is riveted or otherwise secured to terminal plate 292.

Terminal plate 292 is a disk having a diameter greater than the outside diameter of housing 254 and the major portion of the lower edge of that housing rests upon the upper surface of terminal plate 292. However, a plurality of peripherally-spaced depending tabs 298 are provided at the lower edge of housing 254 and these tabs 298 pass through correspondingly spaced notches 300 in the edge of terminal plate 292. Tabs 298 also pass through an enlarged central aperture in the generally annular metallic mounting plate 252 and are bent outwardly to effectively clamp terminal plate 292 and mounting plate 252 together.

The electrical parameters of the system will, of course, be determined by the nature of the mechanical components. With the mechanical arrangement illustrated in the drawings, the preferred circuitry illustrated in FIGURE 2 of the drawings has been found to operate satisfactorily with elements of the following values: Source 12, 110 or 220 volts; transformer 16 secondary voltage, 12 volts; pulser heater winding 32, 42 ohms; resistance of responder heating winding 38, 7 ohms and the resistance of hot wire 50, 21 ohms. The characteristics of the senser have been previously noted. The foregoing values are of course but representative and are subject to substantial modification.

The drawings have been prepared roughly to scale, and to give an appreciation of that scale, the U-shaped responder polymetallic element 22 is, in a constructed form of the invention, under ⅝" in total width from the outer edge of leg 40 to the remote edge of leg 168 while the distance from the inner edge of the crosspiece 170 to the center of the active contact is about 1½".

While the disclosed circuitry is preferred from a number of standpoints, certain modifications are within the contemplation of the inventor. For example, a senser element having a high negative temperature coefficient of resistance may be substituted for the shown senser by simply invertnig the polymetallic strip 20 and prestressing it so that contact 42 will normally engage contact 44, heat from winding 38 tending to deflect those contacts out of engagement. The employment of a rheostat in series with the control circuit or in parallel with the senser is possible but is not recommended since the presence of that element will reduce the sensitivity of the system to a very substantial degree. While there again tends to be a reduction in the sensitivity of the system, it is possible to connect heater winding 38 in series with a non-temperature responsive resistor between conductors 34 and 36 and to then connect the senser element directly in parallel with heater winding 38. With that arrangement, if the senser is an element having a high positive temperature coefficient of resistance then the responder should be provided with normally-closed contacts adapted to open upon heating, while if the senser has a high negative temperature coefficient of resistance the responder should be as shown in the drawings.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system for controlling a heating means in heat transfer relationship with a body to be heated, the combination of an electro-thermal responder including a pair of electrical contacts controlling the heating means, a polymetallic element effective when heated to close said contacts and a heater winding in heat transfer relation with said polymetallic element, electrically actuated apparatus for applying to said heater winding a series of electrical energy pulses, the heating of said polymetallic element by said winding being sufficient at each of at least some of said electrical energy pulses to close said electrical contacts, means including a second polymetallic element effective upon closure of said contacts tending to open said contacts, and sensing means including a resistance having a high temperature coefficient of resistance responsive to the temperature of the body for controlling the magnitude of the electrical energy pulses applied from said apparatus to said heater winding.

2. In a system for association with a source of electrical energy of variable voltage for controlling a heater in heat transfer relation with a body to be heated, the combination of an electro-thermal self-interrupting device including a pair of electrical contacts, a polymetallic element controlling said contacts and heating means for said element; an electro-thermal relay including electrical contact means for controlling the heater; a polymetallic element for controlling said contact means, and heater means for controlling said polymetallic element of said relay; a senser having a high temperature coefficient of resistance disposed in heat transfer relation with said body; and circuit means for connecting said senser, said heating means and said heater means to the source of energy through said electrical contacts, the energy supplied to said heater winding having an average magnitude over a period of time which is effectively independent of voltage variations of the source and which varies in accordance with the resistance of said senser.

3. In a system for association with a source of electrical energy for controlling a heater in heat transfer relation with a body to be heated, the combination of an electro-thermal self-interrupting device including a pair of electrical contacts having open and closed states, a polymetallic element controlling said contacts and heating means for said element; an electro-thermal relay including electrical contact means for controlling the heater, said electrical contact means having open and closed states, a polymetallic element for controlling said contact means, and heater means for controlling said polymetallic element of said relay; a senser having a high temperature coefficient of resistance disposed in heat transfer relation with said body; circuit means for connecting said senser, said heating means and said heater means to the source of energy through said electrical contacts, and means for causing said electro-thermal relay to repetitively open and close said electrical contact means even in the absence of a change of the temperature of the body comprising snap acting means controlling said self-interrupting device for causing said pair of electrical contacts to open and close at a rate sufficiently low with reference to the thermal lag of said electro-thermal relay so that said electro-thermal relay will change the state of said electrical contact means in response to each of at least some of the changes of state of said electrical contacts.

4. The combination of claim 3 in which said last-mentioned means is a permanent magnet and an armature secured in fixed relationship, respectively, with the two electrical contacts constituting said pair of electrical contacts.

5. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated means controlled by said pulsing means and responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposable in heat transfer relation with the body for controlling the length of said interval that said electrical energy actuated means is in said one of said states in accordance with the magnitude of the deviation of the sensed temperature of the body from a preselected temperature.

6. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated means effectively insensitive to heat from the body and to heat from the heating means and controlled by said pulsing means responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposed remotely from said electrical energy actuated means and disposable in heat transfer relation with the body for controlling the length of said interval that said electrical energy actuated means is in said one of said states in accordance with the magnitude of the deviation of the sensed temperature of the body from a preselected temperature.

7. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated means effectively thermally isolated from heat from the body and from heat from the heating means and controlled by said pulsing means and responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposed remotely from said electrically energy actuated means and disposable in heat transfer relation with the body for controlling the length of said interval that said electrical energy actuated means is in one of said states in accordance with the magnitude of the deviation of the sensed temperature of the body from a preselected temperature.

8. In a system energizable from a source of electrical energy for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having a pair of electrical contacts having first and second states and effective even in the absence of a change of the sensed temperature of the body to repetitively change between said first and second states for delivering a plurality of electrical energy pulses from the source, two-state electrical energy actuated means controlled by said pulsing means and responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposable in heat transfer relation with the body and means connecting said resistor to the source through said contacts for controlling the length of said interval that said electrical energy actuated means is in said one of said states in accordance with the magnitude of the deviation of the sensed temperature of the body from a preselected temperature.

9. In a system energizable from a source of electrical energy for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having a pair of electrical contacts having first and second states and effective even in the absence of a change of the sensed temperature of the body to repetitively change between said first and second states for delivering a plurality of electrical energy pulses from the source, two-state electrical energy actuated electro-thermal relay means having a winding and controlled by said pulsing means and responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposable in heat transfer relation with the body and means connecting said resistor and said winding to the source through said contacts for controlling the length of said interval that said electrical energy actuated means is in said one of said states in accordance with the magnitude of the deviation of the sensed temperature of the body from a preselected temperature.

10. In a system energizable from a source of electrical energy of variable voltage for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses having an average magnitude over a period of time which is effectively independent of voltage variations of the source, said pulsing means comprising voltage regulating self-interrupting electrothermal relay means having a pair of electrical contacts and a heater controlled by and controlling said electrical contacts, two-state electrical energy actuated means controlled by said pulsing means and responsive to said energy pulses and effective over a substantial range of sensed temperatures of the body to change states in response to each change of state of said pulsing means, electroresponsive means including said electrical energy actuated means effective during each interval that said electrical energy actuated means is in one of said states to actuate the heating means for a corresponding interval, and means comprising a temperature sensing resistor having a high temperature coefficient of resistance disposable in heat transfer relation with the body and means connecting said resistor to the source through said contacts for controlling the length of said interval that said electrical energy actuated means is in said one of said states in accordance with the magnitude of the deviation of the sensed temperature of the body from a preselected temperature.

11. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated means controlled by said pulsing means and responsive to said energy pulses and effective over a substantial range of sensed temperatures of the body to change states in response to each change of state of said pulsing means and actuated to one of said two states for an interval following each change of state of said pulsing means from said first state to said second state the duration of which is controlled conjointly by the length of time said pulsing means remains in said second state and the magnitude of the energy pulse applied to said electrical energy actuated means, electroresponsive means including said electrical energy actuated means effective during each said interval that said electrical energy actuated means is in a certain one of said states to actuate the heating means for a corresponding interval, and means comprising a temperature sensing resistor having a high temperature coefficient of resistance disposable in heat transfer relation with the body for controlling the magnitudes of the energy pulses applied to said electrical energy actuated means for controlling the length of said interval that said electrical energy actuated means is in said certain one of said states in accordance with the magnitude of the deviation of the sensed temperature of the body from a preselected temperature.

12. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated means having an actuating winding and controlled by said pulsing means and responsive to said energy pulses and effective over a substantial range of sensed temperatures of the body to change states in response to each change of state of said pulsing means and actuated to one of said two states for an interval following each change of state of said pulsing means from said first state to said second state the duration of which is controlled conjointly by the length of time said pulsing means remains in said second state and the magnitude of the energy pulse applied to said electrical energy actuated means, electroresponsive means including said electrical energy actuated means effective during each said interval that said electrical energy actuated means is in a certain one of said states to actuate the heating means for a corresponding interval, and means comprising a temperature sensing resistor connected in series with said pulsing means and said actuating winding and having a high temperature coefficient of resistance disposable in heat transfer relation with the body for controlling the magnitudes of the energy pulses applied to said electrical energy actuated means for controlling the length of said interval that said electrcial energy actuated means is in said certain one of said states in accordance with the magnitude of the deviation of the sensed temperature of the body from a preselected temperature.

13. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated electrothermal relay means having an actuating winding and disposed remotely from the body and from the heating means and controlled by said pulsing means and responsive to said energy pulses and effective over a substantial range of sensed temperatures of the body to change states in response to each change of state of said pulsing means and actuated to one of said two states for an interval following each change of state of said pulsing means from said first state to said second state the duration of which is controlled conjointly by the length of time said pulsing means remains in said second state and the magnitude of the energy pulse applied to said electrical energy actuated means and the duration of which is independent of any change of temperature of the body during that interval, electroresponsive means including said electrical energy actuated means effective during each said interval that said electrical energy actuated means is in a certain one of said states to actuate the heating means for a corresponding interval, and means comprising a temperature sensing resistor connected in series with said pulsing means and said actuating winding and having a high temperature coefficient of resistance disposable in heat transfer relation with the body for controlling the magnitudes of the energy pulses applied to said electrical energy actuated means for controlling the length of said interval that said electrical energy actuated means is in said certain one of said states in accordance with the magnitude of the deviation of the sensed temperature of the body from a preselected temperature.

14. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated electrothermal relay means controlled by said pulsing means effective in response to each change of state of said pulsing means from said first state to said second state to change from one to the other of said two states a delay period after said change from said first state to said second state the duration of which is controlled by the magnitude of the energy pulse applied to said electrical energy actuated means while said pulsing means is in said second state and effective in response to each change of state of said pulsing means from said second state to said first state to change from said other to said one state, electroresponsive means including said electrical energy actuated means effective during each interval that said electrical energy actuated means is in a certain one of said states to actuate the heating means for a corresponding interval, and means comprising a temperature sensing resistor having a high temperature coefficient of resistance disposable in heat transfer relation with the body for controlling the magnitudes of the energy pulses applied to said electrical energy actuated means each time said pulsing means is in said second state for controlling the length of said interval that said electrical energy actuated means is in said certain one of said states in accordance with the magnitude of the deviation of the sensed temperature of the body from a preselected temperature.

15. In a system for controlling a heating means in accordance with the sensed temperature of a body to be heated, means for varying the average heat output of the heating means in accordance with the magnitude of the deviation of the sensed temperature of the body from a preselected temperature comprising electrical relay pulsing means having first and second states and effective even in the absence of a change of the sensed temperature of the body to repetitively change between said first and second states for delivering a plurality of electrical energy pulses, two-state electrical energy actuated electrothermal relay means disposed remotely from the body and from the heating means and controlled by said pulsing means effective in response to each change of state of said pulsing means from said first state to said second state to change from one to the other of said two states a delay period after said change from said first state to said second state the duration of which is controlled by the magnitude of the energy pulse applied to said electrical energy actuated means while said pulsing means is in said second state and effective in response to each change of state of said pulsing means from said second state to said first state and independently of any change of temperature of the body to change from said other to said one state, electroresponsive means including said electrical energy actuated means effective during each interval that said electrical energy actuated means is in a certain one of said states to actuate the heating means for a corresponding interval, and means comprising a temperature sensing resistor having a high temperature coefficient of resistance disposed remotely from said electrical energy actuated means and disposable in heat transfer relation with the body for controlling the magnitudes of the energy pulses applied to said electrical energy actuated means each time said pulsing means is in said second state for controlling the length of said interval that said electrical energy actuated means is in said certain one of said states in accordance with the magnitude of the deviation of the sensed temperature of the body from a preselected temperature.

16. In a system for controlling a heating means in heat transfer relationship with a body to be heated, the combination of an electro-thermal responder including a pair of electrical contacts controlling the heating means, a polymetallic element controlling the contacts and a heater winding in heat transfer relation with said polymetallic element, electrically actuated apparatus for applying to said heater winding a series of electrical energy pulses, the heating of said polymetallic element by said winding being sufficient at each of at least some of said electrical energy pulses to actuate said electrical contacts, and sensing means including a resistance having a high temperature coefficient of resistance responsive to the temperature of the body for controlling the magnitude of the electrical energy pulses applied from said apparatus to said heater winding, said resistance and said heater winding being connected in series with one another across said apparatus.

17. In a system for controlling a heating means in heat transfer relationship with a body to be heated, the combination of an electrically actuated apparatus for supplying a series of pulses of electrical energy, electrically actuatable responding means thermally isolated from the body and heating means and including a pair of electrical contacts and means responsive to each of at least some of said pulses for operating said contacts for an interval during the pulse determined by the magnitude of said pulse, means for energizing the heating means for an interval during each pulse determined by the interval of said contact actuation, and sensing means independent of said responding means and responsive to the temperature of the body for controlling the magnitude of each of the energy pulses applied to said responding means, said electrically actuated apparatus being an electro-thermal self-interrupting device for intermittently connecting a source of electrical voltage to said responding means, the duration of each such connection varying solely with variations in the average magnitude of said voltage so that the energy supply to said responding means during each such connection is effectively independent of variations of said voltage.

18. The combination of claim 16 in which said high temperature coefficient of resistance is positive.

19. The combination of claim 17 in which said electro-thermal self-interrupting device includes a pair of electrical contacts connected in series with said responding means and said sensing means, an actuating polymetallic leg portion controlling said contacts, a compensating leg portion connected to said actuating leg portion, and a heater winding connected to the voltage source through said contacts and in heat transfer relationship with said actuating leg portion.

References Cited in the file of this patent
UNITED STATES PATENTS

| | | |
|---|---|---|
| 1,697,040 | Appelberg | Jan. 1, 1929 |
| 2,510,038 | Rudahl | May 30, 1950 |
| 2,524,506 | Akeley | Oct. 3, 1950 |
| 2,602,132 | Young | July 1, 1952 |
| 2,727,129 | Davis | Dec. 13, 1955 |
| 2,727,973 | Collins | Dec. 20, 1955 |
| 2,736,883 | Boddy | Feb. 28, 1956 |
| 2,815,428 | Pearce | Dec. 3, 1957 |
| 2,819,371 | Aldrich et al. | Jan. 7, 1958 |
| 2,830,164 | Weber et al. | Apr. 18, 1958 |